3,843,528

ALUMINUM COMPLEX SOAP GREASE CONTAINING CALCIUM CARBONATE

Wayne W. Bailey, Gibsonia, and Paul R. McCarthy, Allison Park, Pa., assignors to Gulf Research & Development Company, Pittsburgh, Pa.
No Drawing. Filed Sept. 6, 1973, Ser. No. 394,672
The portion of the term of the patent subsequent to Dec. 4, 1990, has been disclaimed
Int. Cl. C10m 5/02, 5/14
U.S. Cl. 252—18                                       7 Claims

ABSTRACT OF THE DISCLOSURE

A grease composition for lubricating bearings operating at temperatures up to about 350° F. comprises a mineral lubricating oil base having an aniline point below about 230° F. and a grease-forming amount of an aluminum complex soap of benzoic acid and (1) a saturated fatty acid having from 20 to 22 carbon atoms per molecule or (2) a saturated fatty acid mixture which contains at least 50 percent by weight of $C_{20}$ and/or $C_{22}$ fatty acids and precipitated calcium carbonate. The molar ratio of benzoic acid to $C_{20}$–$C_{22}$ fatty acids is about 1.25:1 to about 2:1, benzoic acid to $C_{20}$–$C_{22}$ fatty acids, respectively. The grease composition of the invention is distinguished in its antiwear and extreme pressure characteristics over a similar grease composition which contains no calcium carbonate.

---

This invention relates to a lubricating composition and more particularly to an aluminum complex soap grease composition having improved antiwear and extreme pressure characteristics.

Increased production rates have placed increased loads on existing machinery and particularly on the bearings of such machinery. With increased loads on machinery, bearings are subjected to greater frictional forces with the evolution of heat causing the bearings to operate at temperatures above those which would normally be encountered. Also, many of today's cars are equipped with disc brakes. It is generally recognized that wheel bearings of cars equipped with disc brakes operate at higher temperatures than those equipped with drum brakes.

One of the problems encountered in lubricating bearings operating at high temperatures is the provision of a grease composition which will remain semisolid when subjected to high temperatures. A semisolid structure is desirable to prevent loss of grease by leakage from bearings thereby causing excessive wear and scoring of bearings due to inadequate lubrication. Inasmuch as many bearings operate at temperatures in the order of 200° to 325° F. (93.3° to 162.8° C.) and higher, a grease composition for such bearings should have a low penetration and a high dropping point, i.e., a dropping point of at least about 500° F. (260° C.)

In the past, grease compositions having high dropping points have been obtained by thickening lubricating oils to a grease consistency with various sodium soaps. Unfortunately, the sodium soap greases are not resistant to emulsification in water. Since many grease compositions come in contact with water either during use or during storage, it is desirable for a grease composition to have a high resistance to the effects of water. Highly water resistant greases have been obtained by using various calcium soaps as oil thickening agents, but the calcium soap greases, in general, are unstable at temperatures above about 200° F. (93.3° C.). Attempts have been made to obtain a grease composition having a high dropping point and a high resistance to the effects of water by blending together a soda base grease and a lime base grease. Unfortunately, when soda base and lime base greases are blended together the ratio of lime soap to soda soap required to obtain good water resistance is so high that the dropping point of the grease is reduced below the limits desired for a high-temperature grease.

It is known in the art that high-temperature greases having good water resistance can be obtained by thickening lubricating oils to the consistency of a grease with various combinations of calcium soaps and calcium salts as disclosed in U.S. Pat. No. 2,197,263 dated Apr. 16, 1940 to E. S. Carmichael. While grease compositions having improved high-temperature and water resistant characteristics have been obtained by utilizing soap-salt complexes of calcium, difficulty has been encountered in manufacturing such grease compositions by conventional grease-making procedures because of excessive foaming which has been encountered. Also, difficulty has been encountered in producing a calcium soap-salt grease composition which does not vary in physical characteristics from batch to batch. Special methods of preparing smooth-textured high-temperature calcium soap-calcium salt grease compositions which do not vary in physical characteristics from batch to batch are disclosed in U.S. Pat. No. 3,466,245 dated Sept. 9, 1969 to C. M. Peck, but such methods are economically unattractive for manufacturing an inexpensive all purpose grease composition.

Some degree of commercial success has been obtained in the preparation of high-temperature grease compositions utilizing lithium soaps to thicken the oil. While lithium soap compositions have met with some success in lubricating surfaces exposed to atmospheric conditions, their use as an all purpose lubricant has been hampered because they do not posses all of the properties required of such lubricants. In particular, the lithium soap greases have not had the desired mechanical and chemical stability in the presence of water which is required of all purpose lubricants. The mechanical and chemical characteristics of lithium soap grease compositions in the presence of water has been improved by incorporating a small amount of a calcium soap of a saturated fatty acid having from 12 to 24 carbon atoms in the compositions as disclosed in U.S. Pat. No. 3,402,615 dated July 3, 1962 to L. U. Franklin et al. but such lithium soap grease compositions are economically unattractive for use as all purpose lubricants.

Aluminum soaps and particularly certain aluminum complex soaps have been utilized in producing grease compositions and thus the use of aluminum soaps broadly in formulating grease compositions is not new. For example, a detailed description of one such type of material is disclosed in U.S. Pat. No. 2,599,553 to B. W. Hotten and in U.S. Pat. No. 2,768,138 to B. W. Hotten, et al., wherein an aluminum salt is coprecipitated with an aqueous solution of mixtures of water-soluble soaps to obtain aluminum complex soaps such as aluminum benzoate stearate and aluminum toluate stearate which are then blended with an oil to form a grease composition. Other complex aluminum soap greases in the art are disclosed in U.S. Pat. Nos. 2,654,710; 2,719,826; 3,345,291; 3,511,-781; 3,574,111 and 3,591,505. The aluminum complex soap grease compositions disclosed in the above patents are generally recognized as having higher dropping points and better water resistance than conventional sodium, calcium and lithium soap greases, and thus are suitable for use in rollers and bearings where high temperatures and water are frequently encountered. However, it has been found difficult to prepare aluminum complex soap grease compositions which are uniform in physical characteristics from batch to batch. Frequently, an aluminum complex soap grease will possess one or two desirable qualities and it will be deficient in another respect. In U.S. Pat. No. 3,591,505, an improved grease composition is obtained by a procedure wherein an aluminum alkoxide is reacted sequentially with two different carboxylic acids in the presence of an oil base. The aluminum alkoxide is reacted first with the carboxylic acid of lesser reactivity, e.g., stearic acid, and then with the carboxylic acid of greater reactivity, e.g., benzoic acid. This produces a grease having good physical characteristics but the procedure is rather exacting.

In our copending application Ser. No. 287,239 now Pat. No. 776,846 filed Sept. 8, 1972, we have disclosed an aluminum complex soap grease composition which has a high dropping point and which is resistant to the effects of water, as well as having good resistance to oxidation. The grease composition can be uniformly obtained from batch to batch by thickening a mineral lubricating oil base having an aniline point below about 230° F. (110° C.) with an aluminum complex soap of benzoic acid and a saturated fatty acid having from 20 to 22 carbon atoms or a fatty acid mixture which contains at least 50 percent by weight of the $C_{20}$ and/or $C_{22}$ fatty acids. The molar ratio of benzoic acid to $C_{20}$–$C_{22}$ fatty acids is about 1.25:1 to about 2:1, benzoic acid to $C_{20}$–$C_{22}$ fatty acids, respectively. When a saturated $C_{14}$ to $C_{22}$ fatty acid mixture which contains about 50 to about 60 percent by weight of $C_{20}$ and/or $C_{22}$ fatty acids is employed, the molar ratio of the benzoic acid to saturated $C_{14}$ to $C_{22}$ fatty acid mixture is about 0.7:1 to about 1:1, benzoic acid to saturated fatty acid mixture, respectively. The latter ratio of benzoic acid to fatty acid mixture is sufficient to give a benzoic acid to $C_{20}$–$C_{22}$ fatty acid molar ratio of about 1.25:1 to about 2:1. The improved lubricating composition disclosed in our copending application Ser. No. 287,239 therefore comprises a mineral lubricating oil base having an aniline point below about 230° F. (110° C.) thickened to the consistency of a grease with an aluminum complex soap of benzoic acid and a saturated fatty acid having from 20 to 22 carbon atoms or a fatty acid mixture containing at least 50 percent by weight of the $C_{20}$ and/or $C_{22}$ fatty acids, the molar ratio of said benzoic acid to said $C_{20}$ and/or $C_{22}$ fatty acids being between about 1.25:1 and about 2:1.

While an aluminum complex soap grease composition having a high dropping point and which is resistant to the effects of water, as well as having good resistance to oxidation can be uniformly obtained from batch to batch by thickening a mineral lubricating oil base having an aniline point below about 230° F. (110° C.) to a grease consistency wtih an aluminum complex soap of benzoic acid and a saturated fatty acid having from 20 to 22 carbon atoms or a fatty acid mixture which contains at least 50 percent by weight of the $C_{20}$ and/or $C_{22}$ fatty acids, provided the molar ratio of benzoic acid to $C_{20}$–$C_{22}$ fatty acid is about 1.25:1 to about 2:1, benzoic acid to $C_{20}$–$C_{22}$ fatty acid, respectively, the grease composition thus obtained does not possess the antiwear and extreme pressure characteristics desired for a ball joint lubricant. While the antiwear and extreme pressure characteristics of our previously disclosed aluminum complex soap grease can be improved by the addition to the grease of a compound of a heavy metal such as lead antimony or by the addition of a mixture of sulfurized hydrocarbon, zinc dialkyl dithiophosphate and a chlorinated paraffin, the use of these addition agents is not entirely satisfactory. The use of compounds of heavy metals in lubricants is the subject of much concern by present day environmentalists and toxicologists. Also, the use of some sulfur compounds undesirably cause a grease to darken or turn black.

We have now found that the antiwear and extreme pressure properties of an aluminum complex soap grease prepared from a mineral lubricating oil having an aniline point below about 230° F. (110° C.) and an aluminum complex soap of benzoic acid and a saturated fatty acid having from 20 to 22 carbon atoms or a fatty acid mixture containing at least 50 percent by weight of the $C_{20}$ and/or $C_{22}$ fatty acids wherein the molar ratio of said benzoic acid to said $C_{20}$–$C_{22}$ fatty acids is about 1.25:1 to about 2:1, respectively, can be improved without giving rise to toxicological problems and without causing the grease to darken by the addition of a small amount of precipitated calcium carbonate to the grease composition. The lubricating grease composition of the present invention, therefore, comprises a mineral lubricating oil base having an aniline point below about 230° F. (110° C.) thickened to the consistency of a grease with an aluminum complex soap of benzoic acid and a saturated fatty acid having from 20 to 22 carbon atoms or fatty acid mixture containing at least 50 percent by weight of the $C_{20}$ and/or $C_{22}$ fatty acids, the molar ratio of said benzoic acid to said $C_{20}$ and/or $C_{22}$ fatty acids being between about 1.25:1 and about 2:1 and a small amount, sufficient to improve the antiwear and extreme pressure properties of the grease, of precipitated calcium carbonate.

The amount of precipitated calcium carbonate which we use in the grease composition of the present invention may vary depending upon the particular lubricating oil base employed and upon the characteristics desired in the ultimate composition. In any event, the precipitated calcium carbonate is used in an amount sufficient to improve the antiwear and extreme pressure properties of the grease. In general, the amount comprises about 1 to about 10 percent by weight of the total composition, and preferably about 2 to about 6 percent by weight of the total composition.

The term "aluminum complex soap" as used herein and in the appended claims is intended to mean a mixture of aluminum soap molecules containing at least one hydroxyl anion for each aluminum cation and one or more carboxylic acid anions, and preferably two dissimilar acid anions such as one aromatic, i.e., benzoate anion and one saturated aliphatic, i.e., arachidate or behenate anion. It is to be understood that all individual soap molecules in a given complex soap are not the same. For example, one soap molecule may contain two hydroxyl anions and only one carboxylic acid anion such as an aluminum monoarachidate, an aluminum monobehenate or an aluminum monobenzoate; another may contain one hydroxyl anion and two carboxylic acid anions which are the same, as for example, an aluminum diarachidate, dibehenate or dibenzoate; while a third molecule may contain two dissimilar carboxylic acid anions such as aluminum benzoate arachidate, aluminum benzoate behenate or aluminum arachidate behenate. It will thus be recognized that any given aluminum soap preparation may contain a mixture of all three types of molecules and that the properties of any given aluminum soap preparation may be the average properties of the mixture of molecules present.

The method by which the aluminum complex soap is prepared for use in the grease composition of the present invention is not new per se. Essentially, the soap is prepared in the presence of all or a portion of the base mineral oil by reacting a lower alkoxy-substituted cyclic aluminum oxide trimer, e.g., tri-oxy-aluminum tri-isopropoxide or tri-oxy-aluminum tri-butoxide with a mixture of benzoic acid and a saturated aliphatic (fatty) acid in which $C_{20}$ and/or $C_{22}$ acids predominate at moderate temperatures. The preparation of a similar material is described in Bulletin 7013 issued by Agrashell, Inc. Easton, Pa., (now The Ayers Co., Martin's Creek, Pa.) relating to "Kolate 7013." As disclosed in the publication, all of the mineral oil base and acids are weighed into a vessel and heated to 180° F. (80.2 C.). Then "Kolate 7013" is added to the vessel whereupon an aluminum complex soap is formed. Because of the trimeric structure of the alkoxy-substituted cyclic aluminum oxide, only one mole alcohol is released for each mole of aluminum.

When "Kolate 7013" is used to form the soap, no water is required to effect the reaction. Since "Kolate 7013" is in oil solution, the oil itself becomes a part of the overall grease composition and aids in incorporating the soap in the mineral oil base.

In preparing the aluminum complex soap for use in the grease composition of the present invention, it is important that the ratio of benzoic acid to $C_{20}$–$C_{22}$ fatty acids be carefully controlled so that the molar ratio of benzoic acid to $C_{20}$ and/or $C_{22}$ fatty acids is about 1.25:1 to about 2:1. If the molar ratio is less than about 1.25:1, for example, 1.15 to 1, the water stability and dynamic oxidation stability of the resulting grease composition is substantially reduced.

The amount of the aluminum complex soap which we use in the grease composition of the present invention may vary depending upon the particular lubricating oil base employed and upon the characteristics desired in the ultimate composition. In any event, the aluminum complex soap is used in an amount sufficient to thicken the lubricating oil to a grease consistency. In general, this amount comprises about 2 to about 25 percent by weight of the total composition. When producing a grease corresponding to an NLGI No. 2 grade, the aluminum complex soap comprises about 4 to about 10 percent by weight of the total composition, and preferably about 5 to about 7 percent by weight of the total composition.

The mineral lubricating oil base employed in preparing the grease composition of the present invention may be any of the hydrocarbon oils of lubricating grade customarily used in compounding greases provided the oil or blend of oils has an aniline point below about 230° F. (110° C.) and preferably within the range of about 175° to about 230° F. (79.8° to about 110° C.). The oil may be a refined or semirefined oil having a viscosity of about 100 to about 4000 SUS at 100° F. (37.8° C.). However, an aluminum complex soap grease having maximum shear stability for a given amount of soap is usually obtained with a paraffinic oil or blend of oils having a viscosity of about 300 to about 3000 SUS at 100° F. (37.8° C.). In producing a multipurpose lubricant, it is generally preferred to employ an oil or blend of oils having a viscosity within the range of about 500 to about 1200 SUS at 100° F. (37.8° C.) an aniline point within the range of about 180° to about 200° F. (82.2° to about 93.3° C.) for example, 190° F. (87.8° C.). The oil content of the composition of the invention comprises about 75 to about 98 percent by weight of the total composition The particular oil or oil blend as well as the exact amount of oil employed depends upon the characteristics desired in the finished grease.

Benzoic acid which is used in the preparation of the aluminum complex soap is available commercially so that neither benzoic acid per se nor the process by which it is made constitutes any portion of the invention. Benzoic acid, for example, can be prepared by the air oxidation of toluene, or it can be made by chlorinating toluene to obtain benzotrichloride which is then hydrolyzed to produce benzoic acid. While benzoic acid is marketed in USP, technical and industrial grades, we prefer to use the industrial grade for economic reasons. The amount of benzoic acid used in preparing a grease composition of the invention depends at least in part upon the amount of the fatty acid component employed and vice versa. In any event, the benzoic acid is employed in an amount such that the molar ratio of benzoic acid to $C_{20}$ and/or $C_{22}$ fatty acids is about 1.25:1 to about 2:1.

The saturated aliphatic (fatty) acid which is employed in preparing the aluminum complex soap for use in the composition of the invention can be either a substantially pure fatty acid such as arachidic acid or behenic acid or a mixture of saturated fatty acids containing at least 50 percent by weight of arachidic or behenic acid or mixtures of arachidic and behenic acids. An example of a saturated fatty acid mixture wherein arachidic and behenic acids are present in an amount of at least 50 percent by weight is "Hydrofol 2022-55" which comprises a hydrogenated fish oil fatty acid mixture containing 55 percent by weight of arachidic and behenic acids. The number of carbon atoms in the fatty acid used in preparing the aluminum complex soap is critical. We have found, for example, that the aluminum complex soaps of fatty acids containing less than 20 carbon atoms per molecule or mixtures of fatty acids wherein acids containing less than 20 carbon atoms per molecule predominate when used in conjuntion with benzoic acid do not produce greases having the desirable characteristics which can be obtained with the aluminum complex soaps of the $C_{20}$ and $C_{22}$ fatty acids. The amount of fatty acid used in preparing a grease composition of the invention depends at least in part upon the amount of the benzoic acid component employed and vice versa. In any event, the fatty acid is employed in an amount such that the molar ratio of benzoic acid to $C_{20}$ and/or $C_{22}$ fatty acids is about 1.25:1 to about 2:1.

The precipitated calcium carbonate which is employed in the aluminum complex soap grease composition of the invention is available commercially so that neither precipitated calcium carbonate per se nor the process by which it is obtained constitutes any portion of the invention. The term "precipitated calcium carbonate" applies to the commercial types of the compound produced by chemical means. It serves to distinguish the commercial types from materials produced by mechanical treatment applied to natural varieties of calcium carbonate such as limestone and chalk. Precipitated calcium carbonate is commonly prepared by three known processes, i.e., the by-product process, the carbonation process and the calcium chloride process. The process is not important with respect to the precipitated calcium carbonate employed in the grease composition of the present invention. The precipitated calcium carbonate is employed in an amount sufficient to improve the antiwear and extreme pressure properties of the grease. In general, the amount used comprises about 1 to about 10, preferably about 2 to about 6, percent by weight based on the weight of the total composition.

The lubricating grease composition of the present invention can contain other lubricant additives, if desired, to improve other specific properties thereof. Thus, the grease composition can contain a filler, an antioxidant, a dispersant, an anticorrosion agent, a rust inhibitor, a metal deactivator, other extreme pressure and antiwear agents, a tackiness agent, a dye and the like. Whether or not such additives are employed and the amounts thereof depend to a large extent upon the severity of the conditions to which the composition is subjected. When such additives are employed, they are generally added in amounts between about 0.01 and about 10 percent by weight based on the weight of the total composition. They may be added prior to, during or after the heating steps depending upon the thermal stability of the particular additive employed as will be apparent to those skilled in the art.

In preparing the composition of the present invention, various compounding and blending procedures can be employed in either a batch or a continuous process. For example, the aluminum complex soap can be prepared separately and then blended together with the precipitated calcium carbonate into the mineral lubricating oil or the complex soap can be made in a small amount of oil to form an oil concentrate of the soap which is then blended together with the precipitated calcium carbonate and with the mineral lubricating oil base. In a preferred embodiment, the aluminum complex soap is formed in the presence of a 500 Texas mineral lubricating oil at a temperature of about 320° F. (160° C.). Thereafter, a more viscous mineral lubricating oil is added slowly with stirring while gradually increasing the temperature to about 380° F. (193.3° C.). The mixture, with stirring is then allowed to cool to about 220° F. (104.4° C.) at which time the precipitated calcium carbonate and other addition agents. if desired, can be added. The cooled grease composition is then milled in a paint mill or colloid mill until the desired degree of dispersion is obtained.

In order to illustrate the preparation of a grease composition of the invention more particularly, 75.1 grams of benzoic acid, 189.1 grams of "Hydrofol Acids 2022-25" and 1879 grams of a Texas mineral lubricating oil having a viscosity of about 500 SUS at 100° F. (37.8° C.) and about 55 SUS at 210° F. (98.9° C.) and an aniline point of about 178° F. (81.1° C.) are charged to an open kettle. "Hydrofol Acids 2022-55" is a saturated fatty acid mixture which contains 55 percent by weight of $C_{20}$ and $C_{22}$ saturated fatty acids. The remainder of the acids in "Hydrofol Acids 2022-55" comprises myristic (2%), palmitic (13%) and stearic (30%). The contents of the kettle are then heated with stirring to 205° F. (96.1° C.). To the heated oil-acid mixture are added 122.6 grams of "Kolate 7013." "Kolate 7013" contains tri-oxy-aluminum tri-isopropoxide as the active component and has the following structural formula

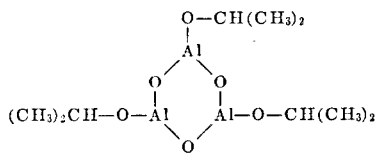

As manufactured, "Kolate 7013" has an aluminum content of at least 12.5% and is a 55% solution of the active component in a naphthenic base stock having a viscosity of about 82 SUS at 100° F. (37.8° C.) and a viscosity index of 29.

After addition of "Kolate 7013," the temperature of the batch is increased to 320° F. (160° C.) at which point the addition of a 150 Mid-Continent Bright Stock mineral oil having a viscosity of about 2600 SUS at 100° F. (37.8° C.) and about 150 SUS at 210° F. (98.9° C.) and an aniline point of about 255° F. (123.9° C.) is initiated. While the aniline point of the Bright Stock oil per se is above the maximum desired where only one oil is used in compositions of the invention, the aniline point of the oil blend which is obtained when 1879 grams of the Texas oil (aniline point of 178° F. [81.1° C.]) and 1566 grams of the Bright Stock oil (aniline point of 255° F. [123.9° C.] are mixed is 190° F. (877.8° C.). The Bright Stock oil is added slowly while the temperature of the batch is increased to 380° F. (193.3° C.). At this point, the heat is turned off and additional Bright Stock oil is added until a total of 1566 grams of such Bright Stock oil has been used. The batch is then stirred and allowed to cool to a temperature of about 220° F. (104.4° C.). At this point, 160 grams of precipitated calcium carbonate, 40 grams of the condensation product of formaldehyde and N,N-dimethylaniline and 40 grams of the reaction product of lime (1 mol), primary cocoamine (2 mols) and phthalic anhydride (2 mols) in one part by weight of Texas mineral oil (1900 SUS at 100° F. [37.8° C.]) per U.S. Pat. No. 2,378,442 are incorporated into the composition. If desired, other additives can also be added at this point. After cooling the batch to a temperature of about 160° to 180° F., (71.1° to 82.2° C.) homogenization of the grease is accomplished by milling the grease in a grease mill such as a Premier mill with a mill setting of 0.006 to 0.008 inch clearance.

The formulation of the finished grease resulting therefrom together with its properties when using the above procedure are as follows:

| Composition: | Wt. percent (grams) |
|---|---|
| 500 Texas oil | 46.2 (1,879) |
| 150 MC Bright stock | 38.5 (1,566) |
| "Hydrofol Acids 2022-55" | 4.6 (189.1) |
| Benzoic acid | 1.8 ( 75.1) |
| "Kolate 7013" | 3.0 (122.6) |
| Precipitated calcium carbonate | 3.9 (160.0) |
| Condensation product of formaldehyde and N,N-dimethylaniline | 1.0 (40.0) |
| Reaction product of lime, primary cocoamine and phthalic anhydride in mineral oil | 1.0 ( 40.0) |
| Molar ratio: | |
| Benzoic acid to fatty acid mixture | 1:1 |
| Benzoic acid to $C_{20}$–$C_{22}$ fatty acids | 1.92:1 |
| Thickener content: | |
| percent (Total Soap) | 7.0 |
| Base Oil: | |
| Viscosity, SUS at 100° F. (37.8° C.) | 1100 |
| Aniline point, °F. (°C.) | 190 (87.8) |
| Inspections of finished grease: | |
| Dropping Point, ASTM D–2265:°F. (°C.) | 555 (290.6) |
| Penetration, ASTM D–217, 77° F. (25° C.) unworked | 288 |
| Worked 60 strokes | 294 |
| Worked 100,000 strokes | 348 |
| Penetration change 60 vs 100,000 strokes | +54 |
| Water Stability, 90% grease-10% water worked 100,000 strokes:penetration | 289 |
| Penetration change 60 vs 100,000 strokes | –5 |
| Oil separation, nickel cone, 50 hours 220° F. (104.4° C.): separation, percent | 1.1 |
| 250° F. (121.1° C.): separation, percent | 1.7 |
| Dynamic oxidation stability, 20 grams grease, rolled at 50 R.P.M. 110 p.s.i. (77341 kgs./sq. meter) oxygen, 72 hours, 210° F. (98.9° C.) (stainless steel roller) | |
| Pressure drop: p.s.i. (kgs./sq. meter) | |
| 24 hours | 5 (3,515.5) |
| 48 hours | 10 (7,031) |
| 72 hours | 10 (7,031) |
| Penetration change 60 strokes vs 72 hours shearing | +49 |

In order to illustrate the improved antiwear and extreme pressure characteristics obtained with a grease composition of the present invention, a base grease composition containing no precipitated calcium carbonate was compared with the same base grease containing precipitated calcium carbonate. The base grease and the grease containing the precipitated calcium carbonate was prepared according to the procedure of the preceding example except that no calcium carbonate was employed in the base grease. In evaluating the antiwear and extreme pressure characteristics of the grease compositions, they were subjected to the Timken Extreme Pressure Test (ASTM D2782-69T), the Four Ball Extreme pressure Test (ASTM D2783-69T) and the Four Ball Wear Test.

In the Timken Test (ASTM D2782-69T) a hardened steel cup is rotated against a steel test block while the grease composition is fed to the point of contact of the two steel specimens. The speed of the rotating steel cup is at a mandrel speed of about 800 r.p.m. The grease is fed at a rate of 45 grams per minute. Pressures between the cup and the test block are regulated by applying a load to a calibrated lever arm. The pressure is increased until the lubricant film is ruptured. The "O.K." value is the maximum load at which the rotating cup will not rupture the lubricant film and cause abrasion between the rotating cup and the stationary block.

In the Four Ball Extreme Pressure Test (ASTM D2783–69T), a testing device is operated with one steel ball under load rotating against three steel balls held stationary in the form of a cradle. The rotating speed is 1770±60 r.p.m. Lubricants are brought to a temperature of 65° to 95° F. (18.3 to 35° C.) and then subjected to a series of tests of 10-second duration at increasing loads until welding occurs. The weld point and load-wear index are then determined.

In the Four Ball Wear Test, three steel balls are securely fastened in contact with each other in a horizontal plane in a cup. A fourth ball in a rotating spindle is placed so that it is entirely supported by the other three balls forming a pyramid. The movable ball is rotated at 1800 r.p.m. for one hour while maintaining the test lubricant at 130° F. (54.4° C.) Separate one-hour tests are conducted using new steel balls at increasing loads (20 and 40 kilograms in the present instance) unless seizure is encountered. Lubricating properties are evaluated from an examination of the scars on the clean surfaces of the three stationary balls, the two maximum right angle diameters of each wear scar being measured to the closest 0.01 millimeter and averaged.

The make-up of the grease compositions and their respective characteristics as determined by the tests described hereinabove are summarized in Table 1.

load and prolonged working under oscillating motions in ball joints. The brine sensitivity provides a measure of the grease's ability to prevent noise of a ball joint when exposed to contamination by brine. It is intended to simulate operation under winter road conditions. According to the Ball Joint Grease Test, a lubricated automotive ball joint stud and bearing confined in a relatively fixed, motionless housing is rocked through an arc under prescribed conditions of rocking frequency, rocking amplitude, load and time. The torque stability and brine sensitivity of the grease composition is reported in terms of "Housing Weight Loss." In the evaluation reported in Table 2, the ball joint was packed with 13.5 grams of the grease composition to be evaluated. The ball joint was then subjected to a load of 1300 pounds, a rocking amplitude of ±12° and a rocking frequency of 150 cycles per minute for a period of 65 hours. In order to illustrate the torque stability of the improved grease composition of the invention, an additional evaluation was made at 130 hours. In the brine sensitivity test, 5 cc. of 10 percent brine was injected into the ball joint at 2, 24 and 48 hours.

Another important consideration in a grease composition is its shear stability when subjected to a high pressure in a roller bearing under oxidizing conditions. The shear stability is determined by the "Dynamic Oxidation Stability" test. In conducting the "Dynamic Oxidation Stability" test, a 20-gram sample of the grease composition to be evaluated is placed in a bomb as described in ASTM D–942. A metal roller 3.42" x 1⅝" diameter is placed in the bomb so that the roller will turn in a rolling manner as the bomb is rotated. The roller can be made from stainless steel or brass. The bomb containing the grease

TABLE 1

| | A | B | C | D |
|---|---|---|---|---|
| Composition, percent by weight: | | | | |
| Texas mineral oil [500 SUS at 100° F. (37.8° C.)] | 50.05 | 48.95 | 47.85 | 46.75 |
| 150 MC bright stock | 40.95 | 40.05 | 39.15 | 38.25 |
| Aluminum soap of benzoic acid | 2.08 | 2.08 | 2.08 | 2.08 |
| Aluminum soap of "Hydrofol Acids 2022-55" [1] | 4.92 | 4.92 | 4.92 | 4.92 |
| Precipitated calcium carbonate | | 2.00 | 4.00 | 6.00 |
| Combined antioxidant, antirust agent and detergent [2] | 1.00 | 1.00 | 1.00 | 1.00 |
| Antioxidant [3] | 1.00 | 1.00 | 1.00 | 1.00 |
| Molar ratio: | | | | |
| Benzoic acid to fatty acid mixture | 1:1 | 1:1 | 1:1 | 1:1 |
| Benzoic acid to $C_{20}$-$C_{22}$ fatty acids | 1.92:1 | 1.92:1 | 1.92:1 | 1.92:1 |
| Thickener content, percent total soap | 7.00 | 7.00 | 7.00 | 7.00 |
| Base oil: | | | | |
| Viscosity, SUS at 100° F. (37.8° C.) | 1,100 | 1,100 | 1,100 | 1,100 |
| Aniline point, °F. (°C.) | 190 (87.8) | 190 (87.8) | 190 (87.8) | 190 (87.8) |
| Inspections of finished grease: | | | | |
| Dropping point, ASTM D-2265: °F. (°C.) | 551 (288.3) | 529 (276.1) | 555 (290.6) | 546 (285.6) |
| Penetration, ASTM D-217: | | | | |
| Unworked | 278 | 278 | 288 | 289 |
| Worked 60 strokes | 282 | 279 | 294 | 283 |
| Worked 100,000 strokes | 303 | 309 | 348 | 302 |
| Penetration change 60 vs. 100,000 strokes | +21 | +30 | +54 | +19 |
| Timken, E.P. Test, 800 r.p.m., 10 min., OK load, lbs. (kgs.): | | | | |
| 45 gr./min. grease feed | 10 (4.5) | 5 (2.3) | 50 (22.7) | 50 (22.7) |
| 4-Ball E.P. Test: | | | | |
| Load wear index | 25.9 | 32.5 | 32.7 | 35.1 |
| Weld point, kg | 126 | 160 | 200 | 250 |
| 4-Ball Wear Test, 1800 r.p.m., 130° F. (54.4° C.), 1 hr. S/S: | | | | |
| Scar diameter (mm.), avg.: | | | | |
| 20 kg | 0.53 | 0.52 | 0.53 | 0.61 |
| 40 kg | 1.87 | 1.66 | 0.68 | 0.68 |

[1] "Hydrofol Acids 2022-55" wt. percent $C_{14}$ (2), $C_{16}$ (13), $C_{18}$ (30), $C_{20}$ (30) and $C_{22}$ (25).
[2] One part by weight of the reaction product of lime (1 mol), primary cocoamine (2 mols) and phthalic anhydride (2 mols) in one part by weight of Texas mineral oil [1900 SUS at 100° F. [37.8° C.)] per U.S. Pat. No. 2,378,442.
[3] Condensation product of formaldehyde and N,N-dimethylaniline.

It will be noted that compositions of the invention (Compositions B, C and D) have improved extreme pressure characteristics over the base grease composition.

In order to illustrate further the improved properties of a grease composition of the invention, the base grease (described above) and Composition C (described above) were evaluated according to a Ball Joint Grease Test procedure for torque stability and brine sensitivity. The Ball Joint Test is intended to evaluate the suitability of greases for use in automotive chassis ball joints. The torque stability provides a measure of the frictional and antiwear properties of a grease composition when subjected to a and the roller is charged with oxygen at a pressure of 110 p.s.i. (77341 kgs./sq. meter). The oxygen-charged bomb containing the grease and metal roller is then placed in an oven maintained at 243° F. (117.2° C.). The bomb temperature is 210° F. (98.9° C.). The bomb is rotated at 50 r.p.m. The pressure drop within the bomb is recorded periodically. At the end of the test period, the penetration value of the grease is measured and compared with the penetration at the start of the test. The make-up of the grease compositions and their respective characteristics as determined by the Ball Joint Test and the "Dynamic Oxidation Stability" test are summarized in Table 2.

TABLE 2

| Composition, percent by weight: | A | C |
|---|---|---|
| Texas mineral oil (500 SUS at 100° F.) 37.8° C.) | 50.05 | 47.85 |
| 150 MC bright stock | 40.95 | 39.15 |
| Aluminum soap of benzoic acid | 2.08 | 2.08 |
| Aluminum soap of "Hydrofol Acids 2022-55" [1] | 4.92 | 4.92 |
| Precipitated calcium carbonate | | 4.00 |
| Combined antioxidant, antitrust agent and detergent [2] | 1.00 | 1.00 |
| Antioxidant [3] | 1.00 | 1.00 |
| Ball Joint Test: | | |
| Torque stability housing weight loss, mg.: | | |
| After 65 hours | 54.6 | 0 |
| After 130 hours | | 4.1 |
| Brine sensitivity, 5 cc-10% brine, injected at 2, 24, 48 hrs.: | | |
| Housing wt. loss after 65 hrs., mg | 225 | 133 |
| Squawk Test | Pass | Pass |
| Dynamic oxidation stability, 20 grams grease rolled at 50 r.p.m., 110 p.s.i. (77,341 kgs./sq. meter) oxygen, 72 hours, 210° F. (98.9° C.) (stainless steel roller): | | |
| Pressure drop, p.s.i. (kgs./sq. meter): | | |
| 24 hours | 0 (0) | 5 (3,516) |
| 48 hours | 3 (2,109) | 10 (7,031) |
| 74 hours | 3 (2,109) | 10 (7,031) |
| Penetration change (72 hours) | +87 | +49 |

[1] "Hydrofol Acids 2022-55" wt. percent $C_{14}$ (2), $C_{16}$ (13), $C_{18}$ (30), $C_{20}$ (30) and $C_{22}$ (25).
[2] One part by weight of the reaction product of lime (1 mol), primary cocamine (2 mols) and phthalic anhydride (2 mols) in one part by weight of Texas mineral oil (1900 SUS at 100° F. (37.8° C.) per U.S. Pat. No. 2,378,442.
[3] Condensation product of formaldehyde and N,N-dimethylaniline.

The data in Table 2 show that the torque stability of a composition of the invention is markedly superior to the torque stability of the base grease.

The lubricating grease compositions of the present invention are useful in lubricating ball and roller bearings, wheel bearings, water pumps, universal joints, automobile chassis, springs, steering gears, pipe threads, aircraft and the like.

While our invention has been described with reference to various specific examples and embodiments, it will be understood that the invention is not limited to such examples and embodiments and may be variously practiced within the scope of the claims hereinafter made.

We claim:

1. A lubricating grease composition comprising a major proportion of a mineral lubricating oil base having an aniline point below about 230° F. thickened to the consistency of a grease with an aluminum complex soap of benzoic acid and a saturated fatty acid having from 20 to 22 carbon atoms per molecule wherein the molar ratio of benzoic acid to $C_{20}$–$C_{22}$ fatty acid is about 1.25:1 to about 2:1, benzoic acid to $C_{20}$–$C_{22}$ fatty acid, respectively, and a small amount, sufficient to improve the antiwear and extreme pressure properties of the grease, of precipitated calcium carbonate.

2. The lubricating grease composition of claim 1 wherein the aniline point of the mineral lubricating oil base is within the range of about 175° F. to about 230° F.

3. The lubricating grease composition of claim 1 wherein the fatty acid is a fatty acid mixture which contains at least about 50 percent by weight of the $C_{20}$ and/or $C_{22}$ fatty acids.

4. A lubricating grease composition comprising a major proportion of a mineral lubricating oil base having an aniline point within the range of about 175° F. to about 230° F., about 2 to about 25 percent by weight of an aluminum complex soap of benzoic acid and a saturated fatty acid mixture which contains at least 50 percent by weight of a mixture of arachidic and behenic acids, wherein the molar ratio of benzoic acid to arachidic and behenic acids is about 1.25:1 to about 2:1, benzoic acid to arachidic and behenic acids, respectively, and a small amount sufficient to improve the antiwear and extreme pressure properties of the grease, of precipitated calcium carbonate.

5. A lubricating grease composition comprising a major proportion of a mineral lubricating oil base having an aniline point within the range of about 175° F. to about 230° F., about 4 to about 10 percent by weight of an aluminum complex soap of benzoic acid and a saturated fatty acid mixture which contains at least 50 percent by weight of a mixture of arachidic and behenic acids, wherein the molar ratio of benzoic acid to arachidic and behenic acids is about 1.25:1 to about 2:1, benzoic acid to arachidic and behenic acids, respectively, and about 1 to about 10 percent by weight of precipitated calcium carbonate.

6. A lubricating grease composition comprising a major proportion of a mineral lubricating oil base having an aniline point within the range of about 175° F. to about 230° F., about 4 to about 10 percent by weight of an aluminum complex soap of benzoic acid and a saturated fatty acid mixture which consists of about 55 percent by weight of a mixture of arachidic and behenic acids and about 45 percent by weight of a mixture of myristic, palmitic and stearic acids, wherein the molar ratio of benzoic acid to mixture of arachidic and behenic acids is about 1.25:1 to about 2:1, benzoic acid to arachidic and behenic acid mixture, respectively, and about 2 to about 6 percent by weight of calcium carbonate.

7. The lubricating grease composition of claim 6 wherein the aniline point of the lubricating oil base is about 190° F.

References Cited
UNITED STATES PATENTS

| 3,186,944 | 6/1965 | Dreher | 252—18 |
| 3,189,543 | 6/1965 | Criddle | 252—18 |
| 3,514,400 | 5/1970 | Hotten | 252—18 |
| 3,271,309 | 9/1966 | Caruso | 252—25 |
| 3,370,007 | 2/1968 | Caruso | 252—28 |

DANIEL E. WYMAN, Primary Examiner

I. VAUGHN, Assistant Examiner

U.S. Cl. X.R.
252—25, 389

PO-1050
(5/69)

UNITED STATES PATENT OFFICE
CERTIFICATE OF CORRECTION

Patent No. 3,843,528            Dated October 22, 1974

Inventor(s) Wayne W. Bailey and Paul R. McCarthy

It is certified that error appears in the above-identified patent and that said Letters Patent are hereby corrected as shown below:

Column 2, line 36, "posses" should read -- possess --.

Column 3, line 17, "No. 776,846" should read -- No. 3,776,846 --.

Column 7, line 56, "(877.8° C.)" should read -- (87.8° C.) --.

Column 11, line 21, "74 hours" should read -- 72 hours --;
              line 25, "cocamine" should read -- cocoamine --.

Signed and sealed this 17th day of December 1974.

(SEAL)
Attest:

McCOY M. GIBSON JR.
Attesting Officer

C. MARSHALL DANN
Commissioner of Patents